(12) United States Patent
Win-Hall

(10) Patent No.: US 7,866,815 B2
(45) Date of Patent: Jan. 11, 2011

(54) ACCOMMODATING OR FOCUSABLE CONTACT LENS

(76) Inventor: Dorothy Mai Win-Hall, 11702 Snowbridge Ct., Tomball, TX (US) 77377

( * ) Notice: Subject to any disclaimer, the term of this patent is extended or adjusted under 35 U.S.C. 154(b) by 143 days.

(21) Appl. No.: 12/383,615

(22) Filed: Mar. 30, 2009

(65) Prior Publication Data

US 2010/0245760 A1 Sep. 30, 2010

(51) Int. Cl.
G02C 7/04 (2006.01)
(52) U.S. Cl. .................................. 351/161; 351/160 R
(58) Field of Classification Search ............. 351/160 R, 351/160 H, 161
See application file for complete search history.

(56) References Cited

U.S. PATENT DOCUMENTS 4,702,573 A * 10/1987 Morstad ..................... 351/161
5,764,339 A * 6/1998 Horton ....................... 351/161
7,559,650 B2 * 7/2009 Iuliano ....................... 351/177

FOREIGN PATENT DOCUMENTS

WO  WO 91/10154  * 7/1991

* cited by examiner

Primary Examiner—Jordan M. Schwartz

(57) ABSTRACT

An "accommodating contact lens" or "focusable contact lens" is a contact lens comprised of a single unit lens, primarily of a rigid gas permeable material, that has one optical power ground into the lens and is fitted for the eye for clear vision at distance when the eye is in a relaxed, unaccommodated state. Unlike a standard single vision, rigid gas permeable contact lens, it has a modified anterior surface, which exists as either an excavated, concave region or heaped ridge running the entire circular midperipheral to peripheral region of the contact lens, that allows the eyelids a contact point on the lens to re-shape or move the contact lens either by squeezing or lifting it anteriorly from the eye during an attempt to accommodate or focus at near, in order to provide to the eye additional power and clear vision at intermediate or near distances.

1 Claim, 10 Drawing Sheets

ACCOMMODATING OR FOCUSABLE CONTACT LENS

BACKGROUND OF THE INVENTION

This invention relates generally to contact lenses and specifically to a completely novel type of contact lens that can be molded and/or altered by the pressure of the eyelids when in the act of attempting to accommodate or "focus". That is, to change the refractive status of the eye such as when trying to clearly visualize objects at different distances, such as from far to near (i.e. accommodation).

In a normal condition, light from the distance (standardly considered 20 feet or more) enters the eye as parallel rays and is brought into a clear image by the optical components of the eye (primarily cornea and lens) to focus on the retina for an emmetropic or refractively corrected (such as with spectacles or contact lenses) eye. This is when the eye is in a relaxed condition, or unaccommodated state. However, when objects are viewed within 20 feet, light from the objects are divergent and a change in power of the same eye is needed to bring these rays into focus. For a person who is phakic (retaining their natural intraocular lens) and pre-presbyopic (still having the ability to accommodate or focus), they can simply rely on their natural physiological focusing ability to adjust the power of their eye (add power) to bring the near light rays into focus. This process involves the contraction of the ciliary body, relaxation of the lens zonules and a change in the shape of the intraocular lens to provide this additional power. This process of changing dioptric power to the eye is called accommodation and diminishes throughout life, but most noticeably after the age of 40 years old until the ability is essentially gone after about age 50 years old, in a condition called presbyopia (Charman 2008).

Currently, several proposed surgical "treatments" for presbyopia are quite invasive and produce irreversible physical changes to the eye. They often require implantation of an artificial intraocular lens that may or may not move with accommodative effort, or implantation of artificial bands in or around the eye, such as with scleral bands, which have not been successful in providing adequate accommodative amplitudes to the presbyopic eye for clear and stable near vision (Glasser 2008).

A more non-invasive, reversible method of alleviating the accommodative deficiency of the eye due to presbyopia are in either spectacle correction with an add, or through various forms of contact lenses, such as with multifocal lenses; or contact lens wearing methods, such as with monovision. These contact lens treatments function by providing pseudoaccommodation with a multifocal or aspheric design (Bennett 2008). However, all of these designs rely on a static contact lens and particularly a static contact lens and eye interaction.

The cornea provides a majority of the refractive power of the eye, but remains relatively stable during accommodation attempts as it is primarily the intraocular lens that produces the most change in shape and subsequently refractive power (Charman 2008). However, studies have shown that the cornea is malleable and does show a small change in shape, with consequent change in refractive power when the eye is accommodating (Pierscionek et al. 2001, yasuda et al. 2003) and after extended periods of reading or near work (Buehren et al. 2003), but will return to its normal state after the end of the accommodation or near viewing effort. It has also been shown that the pressure from the eyelids during this accommodative process is the primary cause of corneal shape change (Buehren et al. 2003).

This invention is stated to provide some level of active accommodation (change in refractive state when viewing from far to near) to the eye by having the wearer change the shape and position of the contact lens, and additionally the tear layer beneath the contact lens, with the pressure of their eyelids during attempts to focus at near, thereby increasing the power to the eye and bringing near objects into focus.

BRIEF SUMMARY OF THE INVENTION

This invention is entirely new in concept and design as it is a single optic design, such as for a standard single vision distance contact lens, but is molded or modified on the outer or anterior mid-peripheral to peripheral portion of the contact lens to allow the eyelid to engage the contact lens during an accommodative or focusing effort thus changing the contact lens' shape and/or position on the eye allowing for an increase in power to the eye and providing clear vision at near.

From the background description, there is a need for a non-surgical, non-spectacle solution or aid for eyes unable to accommodate for clear vision at various distances (e.g. distance, intermediate and near), such as in the condition of presbyopia. It is therefore a main objective of the present invention to provide a novel contact lens designed to provide the unaccommodating patient with clear central vision over a range of distances from far to near.

Another objective of this invention is to provide a single unit contact lens designed to provide clear vision for far when sitting on the cornea of the eye in a relaxed, unaccommodated state.

Another objective of this invention is to provide a single unit contact lens with a molded/modified mid-peripheral to peripheral anterior surface that is thinner than the central region of the lens and has a concave surface and shape in the midperipheral region to allow the eyelids a contact point on the contact lens to re-shape or move the contact lens either by squeezing or lifting it anteriorly from the eye during an attempt to accommodate or focus at near, in order to provide the eye additional power and clear vision at intermediate and near distances.

Another objective of this invention is to provide a single unit contact lens that is capable of being re-shaped by the eyelids during attempts to focus at near distances and then be able to return to its original form when the eye is relaxed to continue providing clear vision at distance.

Another objective of this invention is to be the sole device capable of being called an accommodating or focusable contact lens by the definition that it can change dioptric power to the eye based on an active attempt by the eye to focus at intermediate and near distances.

All of these objectives will be accomplished by the novel design and concept of the lens which provides an anterior contact point (whether excavated region or protruding ridge) on the anterior surface of the contact lens for the eyelid to contact during attempts to focus at near.

BRIEF DESCRIPTION OF THE SEVERAL VIEWS OF THE DRAWINGS

The advantages and features of the invention will become more apparent with reference to the following detailed description of the lenses in conjunction with the drawings, wherein.

All drawings are schematic representations and are either simplified (as with the eye) or exaggerated (as with the contact lens size and component parts).

DETAILED DESCRIPTION OF THE INVENTION

In the following detailed description, because other sequences are possible, the present invention should not be limited to the illustrated embodiments.

Figure 1:
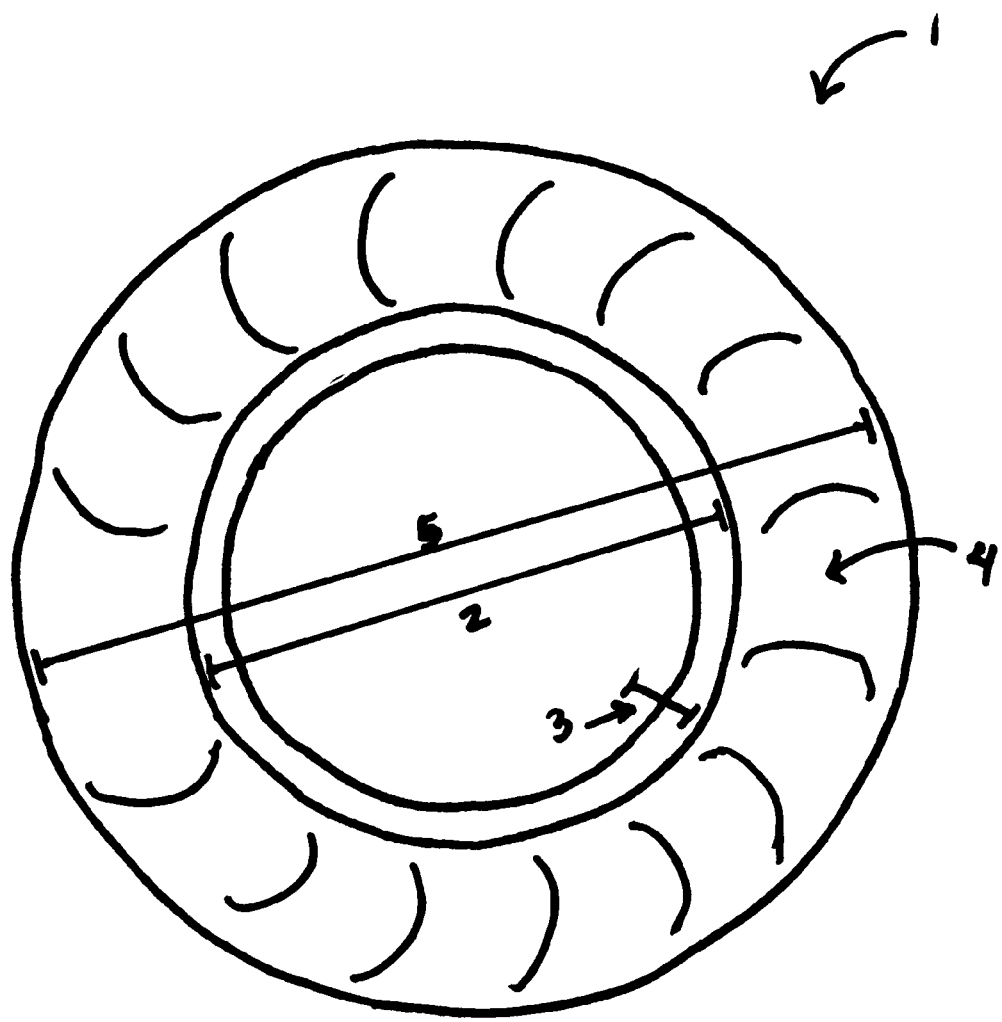
FIG. 1 is a perspective schematic view of one embodiment of the accommodating or focusable contact lens model one described herein.
Figure 2:
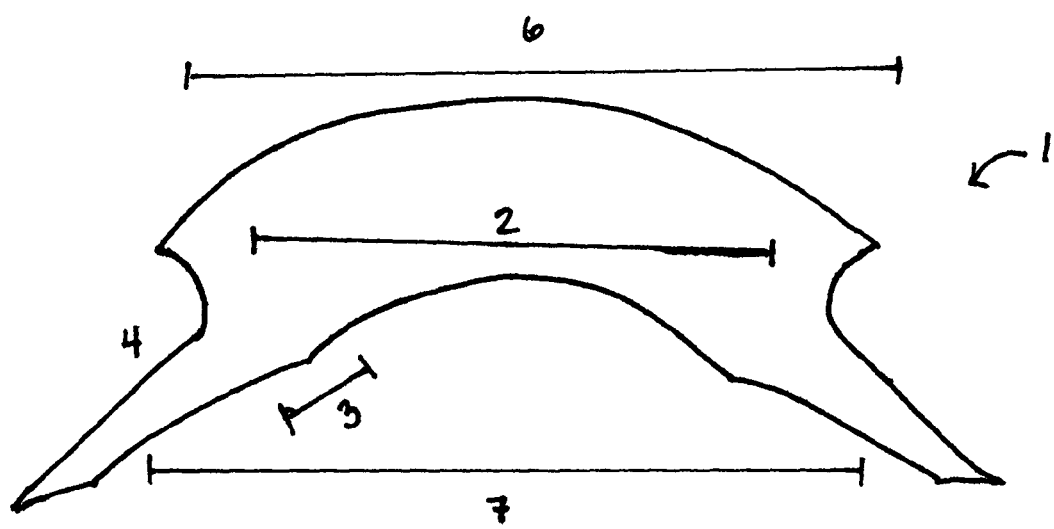
FIG. 2 is a cross-sectional view of another embodiment of the accommodating or focusable contact lens model one described herein.

FIGS. 1 and 2 illustrate one embodiment of the accommodating or focusable contact lens (henceforth to be abbreviated as acl) model one 1. The ad is an all rigid gas permeable contact lens unit (e.g. no separate pieces or junctions as with hybrid models and all of a similar material) with a standard solid central region 2 containing the optic zone and junction with the mid-peripheral zone 3; and a thinner and excavated, concave mid peripheral region in the mid to peripheral area of the lens 4 running the entire circular perimeter of the lens on the anterior side of the lens 6. The diameter 5 of the acl 1 will be dependent on the proper fit on the individual patient's eye, but will generally be as large as, although slightly smaller, as the diameter of the entire anterior cornea 9. The thickness of the lens is fairly uniform through the central region 2 as is standard for an RGP fitting. The mid peripheral to peripheral area 4 is thinner in the range of ⅓ or less than the central region 2. The posterior or back curve of the contact lens 7 will be a standard measure as needed to fit the cornea of the individual patient.

Figure 3:
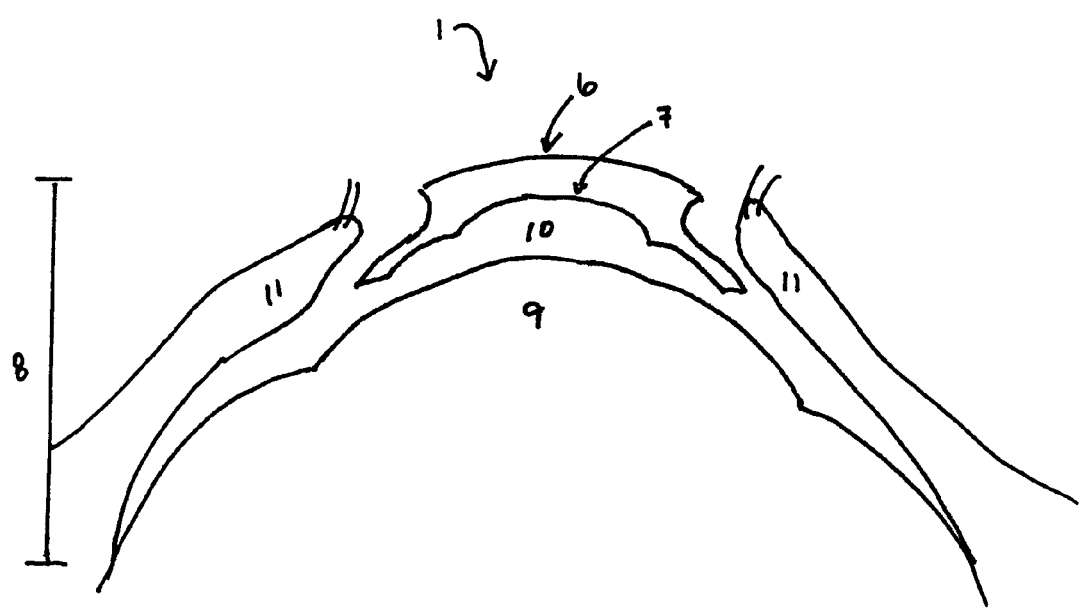
FIG. 3 is a cross-sectional view of another embodiment of the accommodating or focusable contact lens model one on the eye demonstrating fit and position wherein the eye is in a relaxed or unaccommodated state.

FIG. 3 illustrates a cross-sectional side view of the acl model one 1 as it fits onto the eye 8 that is represented here in a relaxed, unaccommodated state. The posterior region 7 is in contact with the anterior of the cornea of the eye 9 with a tear layer 10 in between the posterior ad 7 and the cornea 9. The tear layer 10 should be a fairly even, thin layer that would normally be present in the wear of a standard rigid gas permeable contact lens. The eyelids 11 of the patient should be able to slide over the entire anterior portion of the acl 6 with regular, relaxed blinking.

Figure 4:
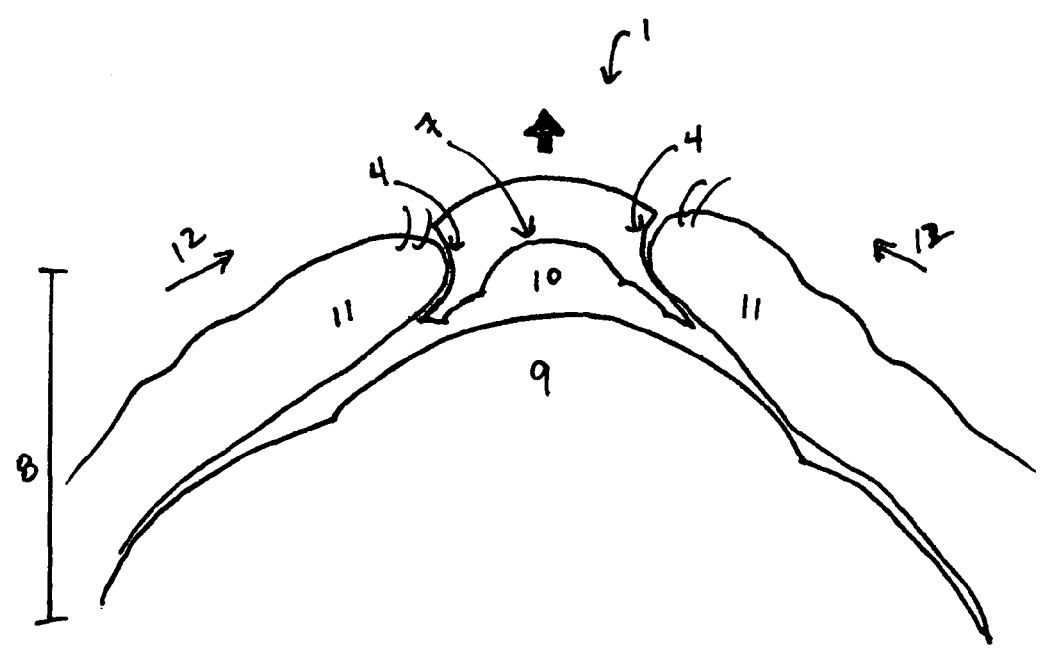
FIG. 4 is a cross-sectional view of another embodiment of the accommodating or focusable contact lens model one on the eye demonstrating fit and position wherein the eye is in an accommodated or focusing state.

FIG. 4 illustrates a cross-sectional side view of the acl model one 1 as it fits onto the eye 8 that is represented here attempting to accommodate or focus. In this posture, the eyelids 11 will move anteriorly 12 and press upon the acl 1 at the anterior excavated region 4 and the eyelids 11 engage with this concave region in the midperipheral area 4 and pushes the ad forward in an anterior direction from the eye, lifting it slightly and allowing the tear layer 10 beneath the posterior acl 7 to increase in size and thickness as well as possibly adding slight flexure to the contact lens itself 1 and thereby producing an increase in dioptric power to the eye.

Figure 5:
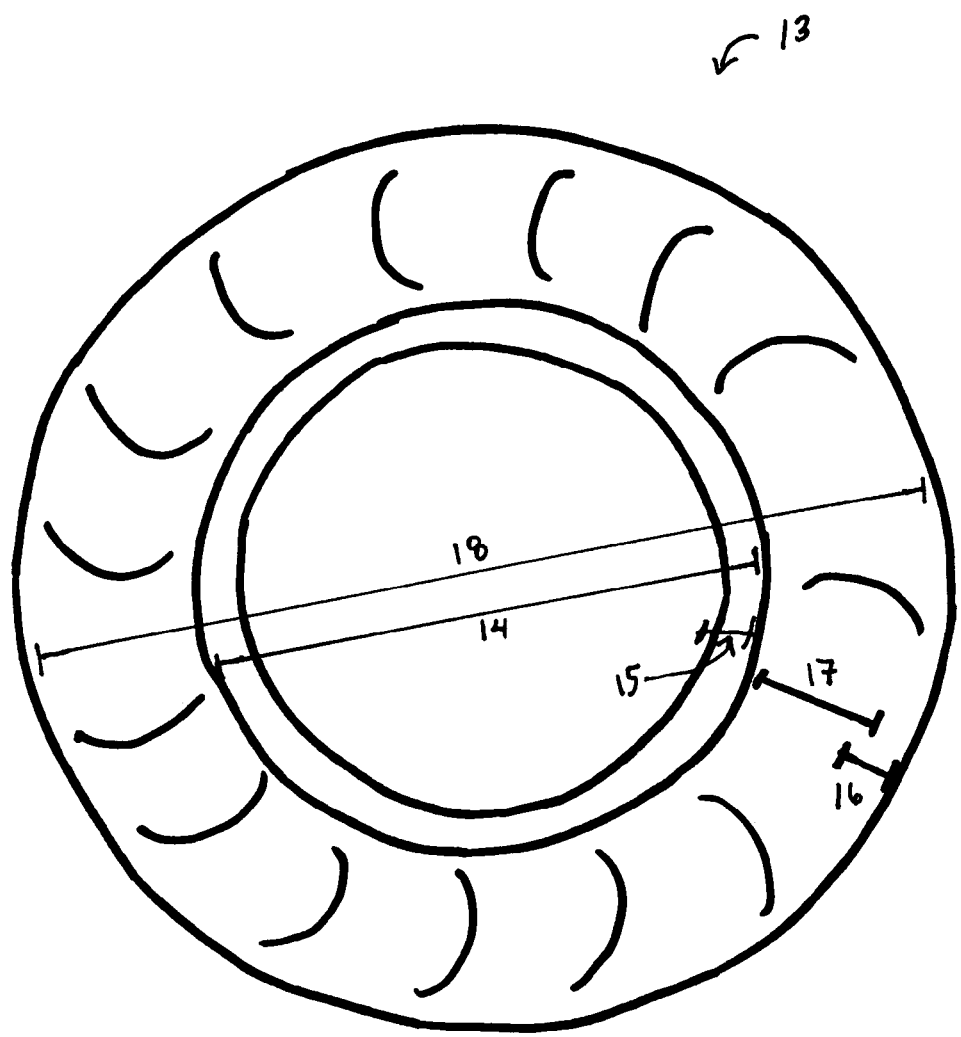
FIG. 5 is a perspective schematic view of one embodiment of the accommodating or focusable contact lens model two described herein.
Figure 6:
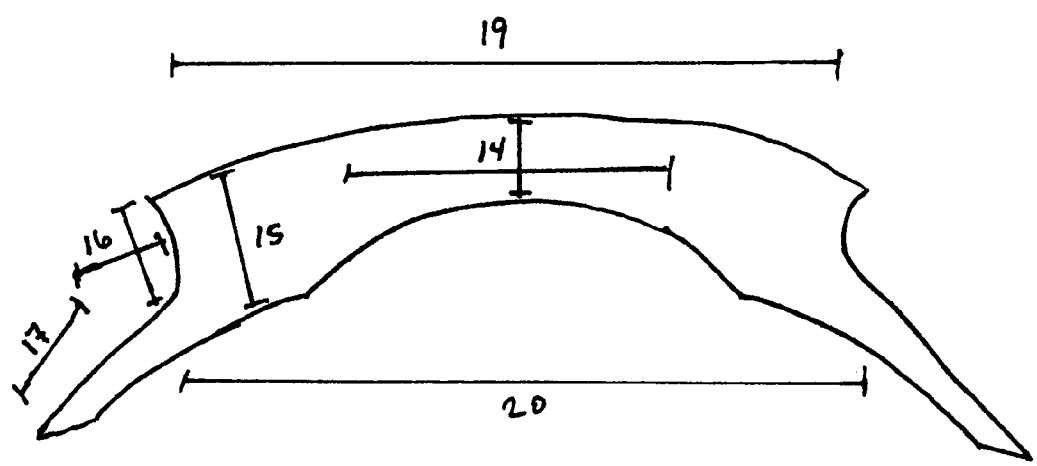
FIG. 6 is a cross-sectional view of another embodiment of the accommodating or focusable contact lens model two described herein.

FIGS. 5 and 6 illustrate one embodiment of the accommodating or focusable contact lens, model two 13. This secondary model of the acl is still composed of an all rigid gas permeable contact lens unit (e.g. no separate pieces or junctions as with hybrid models and all of the same material) but with a thinner central region 14 containing the optic zone and junction with the central/mid-peripheral zone being of a more standard thickness or thicker 15 up to an excavated, concave mid peripheral region 16 and a thinner peripheral area of the lens 17 running the entire circular perimeter of the lens on the anterior side of the lens 19. The diameter 18 of the ad model two 13 will be dependent on the proper fit on the individual patient's eye, but will generally be close to, although smaller, than the diameter of the entire anterior cornea 9. The thickness of the contact lens through the central region 14 is thinner than a standard rigid gas permeable contact lens to allow greater flexure to this region from the pressure of the eyelids 11 squeezing together towards the center of the eye during attempts to accommodate or focus. The thicker mid peripheral area 15 before the excavated, concave mid-peripheral 16 area, into which the eyelids 11 would engage the contact lens during attempts to accommodate or focus allows stability of the lens during this flexure as well as limiting the flexure to this optic zone area 14. The tear lens 10 beneath the contact lens would again also increase in thickness and thereby provide an increase in dioptric power to the eye during attempts to accommodate or focus with this contact lens. The mid peripheral to peripheral area 16-17 of this model is again thinner in the range of ⅓ or less than the central region 14. The posterior or back curve of the contact lens 20 will be a standard measure as needed to fit the cornea of the individual patient.

Figure 7:
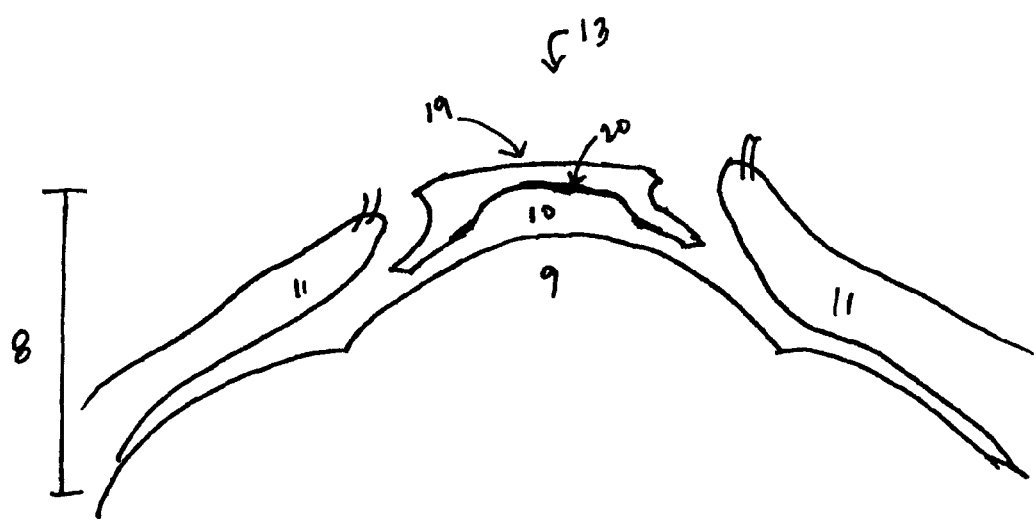
FIG. 7 is a cross-sectional view of another embodiment of the accommodating or focusable contact lens model two on the eye demonstrating fit and position wherein the eye is in a relaxed or unaccommodated state.

FIG. 7 illustrates a cross-sectional side view of the acl model two 13 as it fits onto the eye 8 that is represented here in a relaxed, unaccommodated state. The posterior region 20 is in contact with the anterior of the cornea of the eye 9 with a tear layer 10 in between the posterior ad 20 and the cornea 9. The tear layer 10 should be a fairly even, thin layer that would normally be present in the wear of a standard rigid gas permeable contact lens. The eyelids 11 of the patient should be able to slide over the entire anterior portion of the acl 19 with regular, relaxed blinking.

Figure 8:
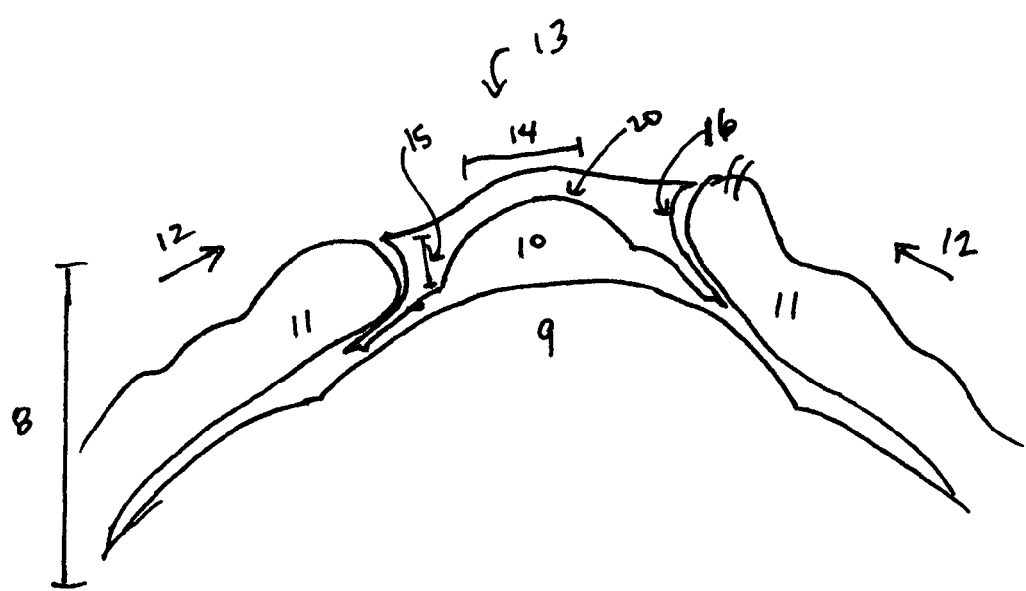
FIG. 8 is a cross-sectional view of another embodiment of the accommodating or focusable contact lens model two on the eye demonstrating fit and position wherein the eye is in an accommodated or focusing state.

FIG. 8 illustrates a cross-sectional side view of the acl model two 13 as it fits onto the eye 8 that is represented here attempting to accommodate or focus. In this posture, the eyelids 11 will move anteriorly 12 and press upon the acl 13 at the mid-peripheral anterior excavated region 16 and the eyelids 11 engage with the concave region in the midperipheral area 16 and push the entire ad forward in an anterior direction from the eye, lifting it slightly and allowing the tear layer 10 beneath the posterior ad 20 to increase in size and thickness as well as flexing the central portion of the lens 14 (containing the optic zone) anteriorly while keeping the thicker central/midperipheral region 15 the same and thereby changing its shape significantly and thereby producing an increase in dioptric power to the eye.

Figure 9:
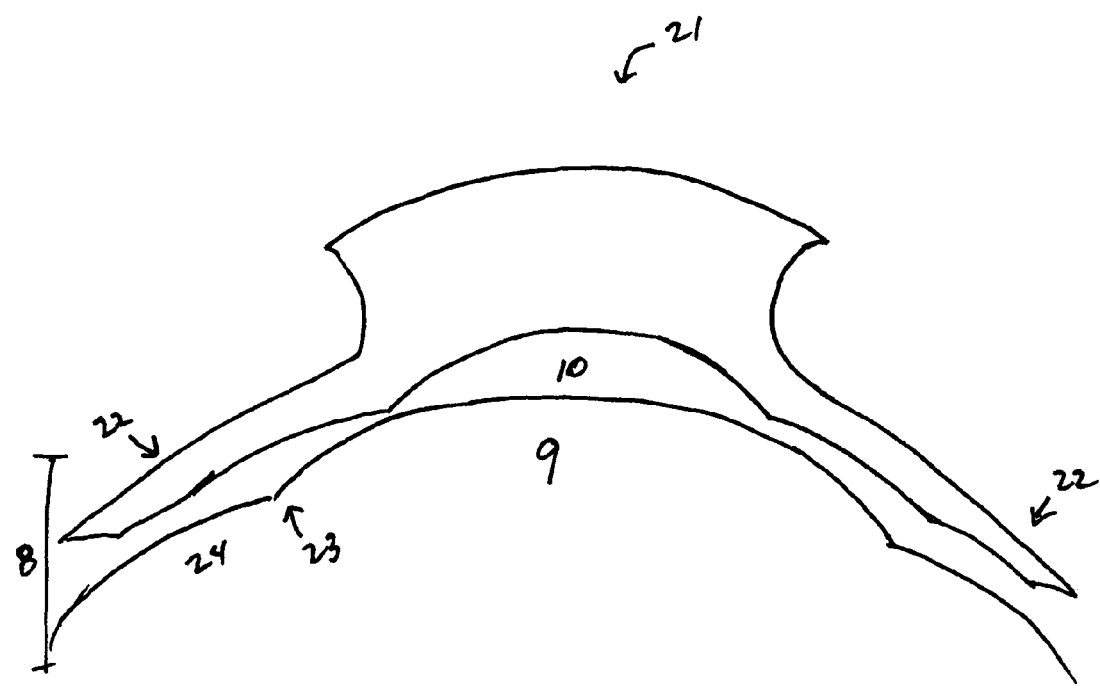
FIG. 9 is a cross-sectional view of another embodiment of another version of the accommodating or focusable contact lens for either model one or two described herein with an extended peripheral region over the limbal and a small portion of the sclera.

FIG. 9 illustrates a cross-sectional view of another embodiment of another version of the accommodating or focusable contact lens 21 for either model one 1 or two 13 described herein, but with an extended peripheral region 22 to fit over the limbal 23 and a small portion of the scleral region 24 of the eye 8 for better stability and/or comfort of fit on the eye 8.

Figure 10:
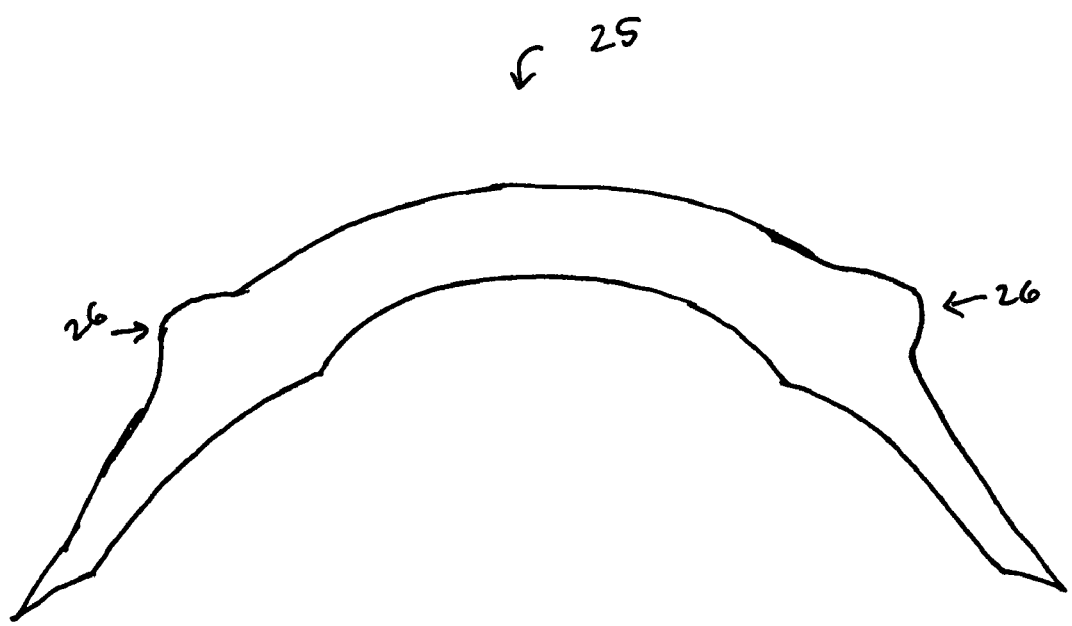
FIG. 10 is a cross-sectional view of another embodiment of another version of the accommodating or focusable contact lens for either model one or two described herein with a protruding ridge ring instead of an excavated circular region.

FIG. 10 illustrates a cross-sectional view of another embodiment of another version of the accommodating or focusable contact lens 25 similar in principle and basic elements as either model one 1 or two 13 described herein with the modification of a protruding ridge 26 running the entire circular midperipheral region of the anterior portion of the lens instead of an excavated region 4 or 16. Just as with model one 1 or two 13 of the acl, the eyelids 11 would contact and engage with this protruding ridge 26 during an attempt to focus, squeezing or lifting the lens anteriorly from the cornea 9.

Of course, the foregoing description is that of certain features, aspects and advantages of the present invention to which various changes and modifications can be made without departing from the spirit, purpose and scope of the present invention. Those skilled in the art will recognize that the invention can be embodied or carried out in a manner that achieves or optimizes one advantage or a group of advantages as taught or suggested herein. In addition, while variations of the invention have been shown in two models and four versions, and described in detail, other modifications and methods of use, which are within the scope of this invention, will be readily apparent to those of skill in the art based upon disclosure. Accordingly, it should be understood that various features and aspects of the disclosed embodiments can be combined with or substituted for one another in order to form varying modes of the discussed ac. Although a preferred and general embodiment of the lens apparatus and method of its use has been illustrated in the accompanying drawings and described in the detailed description, it is understood that the invention is not limited to the embodiment disclosed herein, but is capable of numerous rearrangements, modifications and substitutions without departing from the spirit of the invention as set forth by the following claims.

REFERENCES

1) Bennett, E. S., Contact lens correction of presbyopia, *Clin Exp Optom* 2008;91:3:265-278.
2) Buehren, T., Collins, M. J., Carney, L., Corneal aberrations and reading, *Optom Vis Sci* February 2003;80(2):159-66.
3) Charman, W. N., The eye in focus: accommodation and presbyopia, *Clin Exp Optom* 2008;91:3:207-225.
4) Glasser, A., Restoration of accommodation: surgical options for correction of presbyopia, *Clin Exp Optom* 2008;91:3:279-295.
5) Pierscionek, B. K., Popiolek-Masajada, A., Kasprzak, H., Corneal shape change during accommodation, *Eye* December 2001;15(Pt6):766-9.
6) Yasuda, A., Yamaguchi, T., Ohkoshi, K., Changes in corneal curvature in accommodation, *J Cataract Refract Surg* 2003;29:1297-1301.

What is claimed is:

1. A contact lens designed to provide only a single dioptric power when not engaged or contacting the eyelids of the user and being formed of a rigid gas permeable material and having a posterior curvature surface made to fit the predetermined corneal surface of a specific eye with the anterior portion of the said contact lens comprising a central optic zone that provides a single dioptric power when the lens is not engaging or contacting the eyelids of the user and is of solid material; the mid peripheral to peripheral portion of the anterior of the said lens being modified so as to allow the upper and lower eyelids to engage or contact the lens in order to change its shape or position on the eye when attempting to accommodate or focus by having the eyelids apply pressure on the lens effectively squeezing or lifting the lens away from the surface of the eye and thereby providing additional dioptric power to the eye either in the changed shape of the lens by said squeezing and/or position of the lens by said lifting or the changed shape of the tear film layer beneath the lens or by changes in both the shape of the lens by said squeezing and/or position of the lens by said lifting and the changed shape of the tear film layer beneath the lens and upon release of the said lens by relaxing the eyelids, the lens reverts back to its original form and dioptric power or to its original position on the eye.

* * * * *